US006704630B2

(12) United States Patent
Ostrom et al.

(10) Patent No.: US 6,704,630 B2
(45) Date of Patent: Mar. 9, 2004

(54) THRUST CONTROL MALFUNCTION ACCOMMODATION SYSTEM AND METHOD

(76) Inventors: Grazyna Balut Ostrom, 5858 S. 292$^{nd}$, Auburn, WA (US) 98001; Kevin S. Brown, 6014 S. 238$^{th}$ Pl., D101, Kent, WA (US) 98032; Kenny L. Fung, 16819 69$^{th}$ Pl. West, Lynnwood, WA (US) 98037; Shahrokh Ghayem, 4531 46$^{th}$ SW., Seattle, WA (US) 98116

( * ) Notice: Subject to any disclaimer, the term of this patent is extended or adjusted under 35 U.S.C. 154(b) by 100 days.

(21) Appl. No.: 10/116,655

(22) Filed: Apr. 4, 2002

(65) Prior Publication Data

US 2003/0191565 A1 Oct. 9, 2003

(51) Int. Cl.$^7$ ................................................ G06F 7/00
(52) U.S. Cl. ............................................ 701/29; 701/36
(58) Field of Search ............................ 701/29, 36, 30, 701/31, 14, 3; 244/75 R, 194, 195

(56) References Cited

U.S. PATENT DOCUMENTS

| | | | | | |
|---|---|---|---|---|---|
| 4,136,517 A | * | 1/1979 | Brown | ......................... | 60/223 |
| 5,111,402 A | * | 5/1992 | Brooks et al. | ................. | 701/35 |
| 6,389,335 B1 | * | 5/2002 | Vos | ................................ | 701/4 |

* cited by examiner

*Primary Examiner*—Yonel Beaulieu

(57) ABSTRACT

A system for detecting and correcting a thrust control malfunction in an aircraft engine. The system includes an electronic engine control (EEC) unit that includes a first processing subsystem and a second processing subsystem, and a thrust control malfunction accommodation (TCMA) circuit included in the first processing subsystem and the second processing subsystem. Additionally, the system includes a TCMA software package executed by the first processing subsystem and the second processing subsystem, thereby providing redundant execution of the TCMA software package.

20 Claims, 3 Drawing Sheets

THRUST CONTROL MALFUNCTION ACCOMMODATION SYSTEM AND METHOD

FIELD OF INVENTION

The invention relates generally to thrust controls for aircraft engines, and more specifically to a thrust control system to promptly correct a thrust control malfunction, thereby ensuring that no single fault of an aircraft's propulsion control system will result in an unaccommodated thrust control malfunction.

BACKGROUND OF THE INVENTION

Malfunctions in aircraft power plant thrust control systems can result in uncontrollable high engine power levels that are potentially hazardous or catastrophic for aircraft operation. A particularly hazardous situation is when a thrust control system failure results in one of the aircraft's engines continuing to operate at a high power condition and not responding to a throttle command to reduce power during takeoff, approach or landing. Typically, when this failure mode occurs, the actual thrust either increases to a significantly higher than commanded thrust and/or remains at a high level when the thrust levers are set for low thrust. If one engine fails to respond to a command to reduce power, a high asymmetric thrust condition occurs, creating a high lateral force on the aircraft that is very difficult for a pilot to control. Even if the asymmetry can be controlled, the excess thrust may cause the airplane's stopping distance to exceed the available runway length. In such cases, exceptional skills and prompt flight crew action may not be adequate to avoid risks to aircraft safety.

Some recent thrust limiting systems have reduced the potential for this failure mode to occur, but have not eliminated the risk. Known limiting systems include automatic engine shutdown and thrust cutback features, but are designed to be activated only if the engine rotor speed exceeds specified levels. These levels will not necessarily be exceeded in the event of a thrust control malfunction. Increased traffic and congestion, as well as the increased use of parallel taxiways and runways have increased the potential for an aircraft experiencing such a failure to impact other aircraft, ground support equipment, or a terminal. Thus, such a failure could potentially impact the occupants of multiple aircraft, terminal spaces, and/or ground support personnel.

Therefore, it would be desirable to implement an automatic thrust control malfunction accommodation system that would automatically detect a failure of an aircraft engine to throttle down when idle or low thrust is selected, and mitigate the failure by automatically reducing engine power. Such a system would ensure that no single fault of an aircraft's propulsion control system will result in an unaccommodated thrust control malfunction. It would also be desirable to implement such a system in existing aircraft design by exploiting the resources of the existing engine control system without adding any major new components.

BRIEF SUMMARY OF THE INVENTION

In one preferred embodiment the present invention is directed to a system and method for detecting and correcting a thrust control malfunction in an aircraft engine. The system includes an electronic engine control (EEC) unit that includes a first processing subsystem and a second processing subsystem, and a thrust control malfunction accommodation (TCMA) circuit included in the first processing subsystem and the second processing subsystem. Additionally, the system includes a TCMA software package executed by the first processing subsystem and the second processing subsystem, thereby providing redundant execution of the TCMA software package.

The method of the present invention compares the engine's actual power level with a threshold contour defined by the TCMA software package. When the TCMA software package determines that a thrust control malfunction has occurred, based on the engine's power level exceeding the threshold contour, the engine is shut down by the TCMA circuit.

The present invention is still further directed to an electronic engine control (EEC) unit configured to detect and correct an aircraft engine thrust control malfunction using an active-active functionality. The EEC includes a first processing subsystem for unilaterally monitoring engine operation and shutting down the engine when a thrust control malfunction occurs, and a second processing subsystem for unilaterally monitoring engine operation and shutting down the engine when a thrust control malfunction occurs.

BRIEF DESCRIPTION OF THE DRAWINGS

The present invention will become more fully understood from the detailed description and accompanying drawings, wherein.

DETAILED DESCRIPTION OF THE INVENTION

Figure 1:
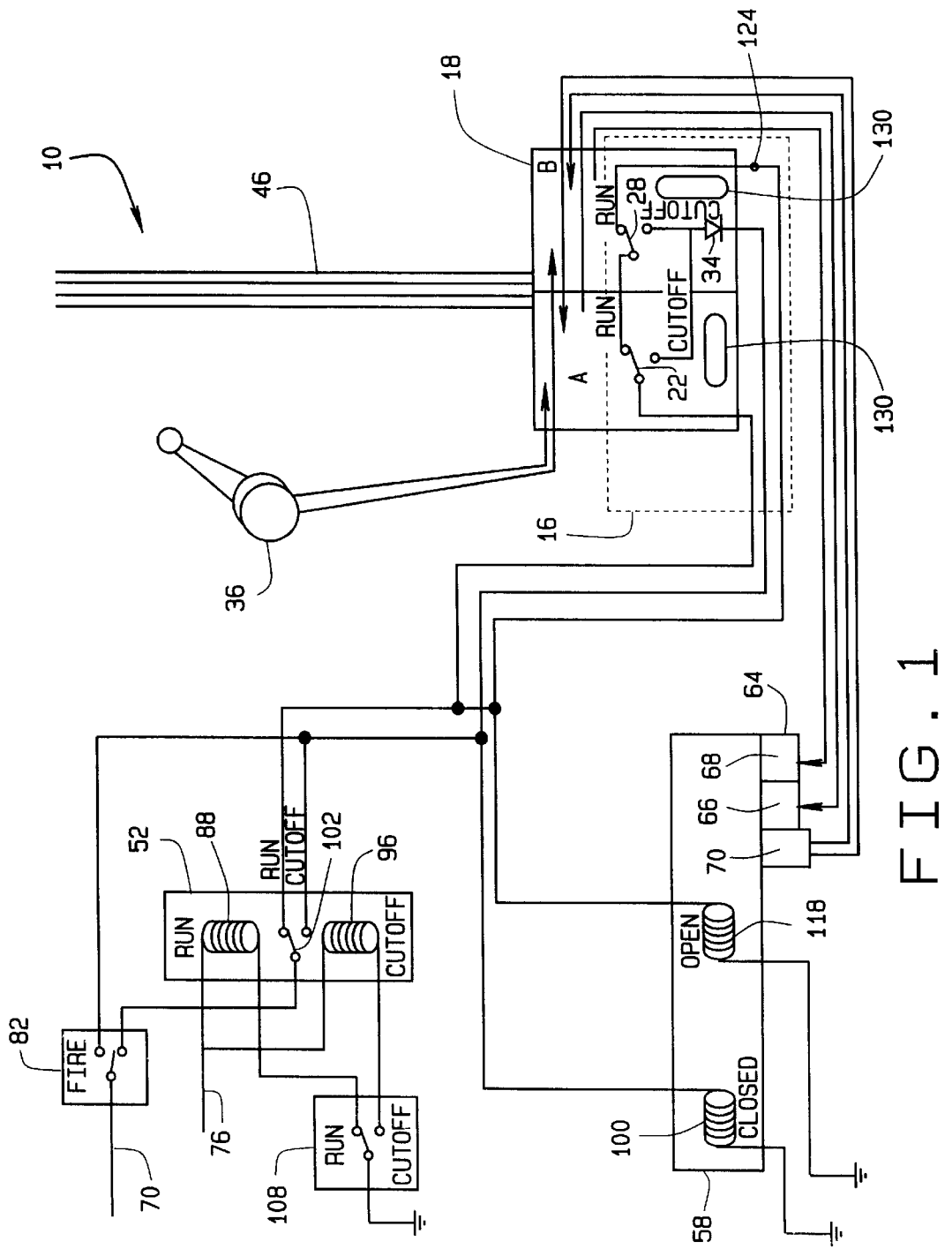
FIG. 1 is a schematic of an aircraft engine control system that includes a thrust control malfunction accommodation (TCMA) circuit, in accordance with a preferred embodiment of the present invention.

FIG. 1 is a schematic of an aircraft engine control system 10, in accordance with a preferred embodiment of the present invention, including a thrust control malfunction accommodation (TCMA) circuit 16. In this preferred embodiment, TCMA circuit 16 is included in an electronic engine control (EEC) 18 that is mounted on an aircraft engine. EEC 18 includes a first processing subsystem 20a, or channel A, and a second processing subsystem 20b, or channel B. TCMA circuit 16 includes a first EEC channel relay switch 22, a second EEC channel relay switch 28 and a diode 32. First EEC processing subsystem 20a, i.e. channel A, and second EEC processing subsystem 20b, i.e. channel B, each have a dedicated processor 34, a dedicated memory device (not shown), and dedicated input sensors (not shown). Unless otherwise specified, the adjectives "first" and "second", as used herein are not intended to imply an order of importance or a sequence, but merely used to arbitrarily identify two similar objects or components.

System 10 includes the EEC 18, a thrust lever 36, digital Aeronautical Radio Incorporated (ARINC) data bus lines 46, an electrical load management system (ELMS) 52, a high pressure shutoff valve (HPSOV) 58, and a hydro mechanical unit (HMU) 64. Thrust lever 36 is electrically connected to EEC processing subsystems 20a and 20b.

ARINC data bus lines 46 are electrically connected to EEC 18. ELMS 52 is electrically connected to TCMA circuit 16 within EEC 18 and HPSOV 58. HMU 64 is electrically connected between HPSOV 58 and EEC 18. HMU 64 includes a first fuel metering valve (FMV) torque motor 66, a second FMV torque motor 68, and a feedback device 70. First torque motor 66 is controlled by EEC first processing subsystem 20a and second torque motor 68 is controlled by EEC second processing subsystem 20b.

Additionally, system 10 includes a first voltage input 72 and a second voltage input 76 that supply predetermined voltages to system 10, for example 28 volts DC. First input 72 is electrically connected to a fire relay switch 82 and second input 76 is electrically connected to a run coil 88 and a cutoff coil 96, both included in ELMS 52. A HPSOV closed coil 100 is connected to fire relay switch 82, an ELMS relay switch 102 and diode 32. Furthermore, system 10 includes a fuel control relay switch 108 that is electrically connected to run coil 88 and cutoff coil 96. When in the run position, ELMS relay switch 102 is electrically connected to EEC relay switch 22. When in the cutoff position, ELMS relay switch 102 is connected to HPSOV closed relay switch 100 and diode 32. A HPSOV open coil 118 is electrically connected to EEC 18 at an output 124.

In a preferred embodiment, HPSOV 58 is controlled by fuel control relay switch 108, which is located in the cockpit of the aircraft. Placing fuel control switch 108 in the run position while fire relay switch 82 is in the normal position causes input 72 to supply voltage, for example 28 volts DC, across HPSOV open coil 118. When fuel control switch 108 is placed in the run position, voltage is supplied across ELMS run coil 88, which energizes ELMS run coil 88 and causes ELMS relay switch 102 to be in the run position. With ELMS relay switch 102 in the run position, ELMS 52 supplies electrical current to EEC first channel relay switch 22. If switch 22 is in the run position, current flows to EEC second channel relay switch 28, and if switch 28 is also in the run position, voltage is applied across HPSOV open coil 118, which energizes HPSOV open coil 118 and allows fuel to flow to the engine utilizing HMU 64. Thus, for HPSOV open coil 118 to be energized, and for fuel to flow to the engine, both EEC first channel relay switch 22 and EEC second channel relay switch 28 must be in the run position. If either one of the EEC channel switches 22 and 28 is in the cutoff position HPSOV open coil 118 is not energized and HPSOV closed coil 100 is energized, thereby closing the HPSOV and shutting off fuel flow to the engine.

Placing fuel control switch 108 in the cutoff position causes input 72 to supply voltage, for example, 28 volts DC, across HPSOV closed coil 100. When fuel control switch 108 is placed in the cutoff position, voltage is supplied across ELMS cutoff coil 96. This energizes ELMS cutoff coil 96 and causes ELMS relay switch 102 to be in the cutoff position. Current flows to HPSOV closed coil 100, thereby energizing HPSOV closed coil 100. Energizing HPSOV closed coil 100 shuts off fuel flow to the engine utilizing HMU 64. EEC diode 32 prevents current from flowing from ELMS relay switch 102 to EEC channel switches 22 and 28, thereby protecting against a short to ground inside EEC 18. This ensures that failures inside EEC 18 do not prevent a pilot from being able to shut off the fuel to the engine using fuel control switch 108.

EEC first processing subsystem 20a, i.e. channel A, controls relay switch 22 and EEC second processing subsystem 20b, i.e. channel B, controls relay switch 28. If either EEC first processing subsystem 20a or EEC second processing subsystem 20b, utilizing an engine control malfunction software package 130, detects that the engine is producing excessive thrust while throttle 36 is set to idle, the processing subsystem will close its respective relay switch 22 or 28. When fuel control switch 108 is in the run position, and either EEC relay switches 22 or 28 are moved to the cutoff position, the current flowing to HPSOV open coil 118 is diverted to HPSOV closed coil 100. Thus, HPSOV open coil 118 is de-energized and HPSOV closed coil 100 is energized, thereby shutting off fuel flow to the engine and causing the engine to shut down.

Thus, TCMA circuit 16 is controlled by first processing subsystem 20a and second processing subsystem 20b. The first processing subsystem 20a and the second processing subsystem 20b redundantly execute the engine control malfunction software package 130 to determine when an engine shutdown should be triggered. Via the execution of software package 130, each of the processing subsystems 20a and 20b monitors the position of thrust lever 36, engine power level, and several other digital inputs provided from the aircraft via digital ARINC data buses 46.

Typical EECs installed on modern commercial transport airplanes include two processing subsystem, or channels, arranged in an active/hot-spare configuration such that one processing subsystem is actively controlling the engine while the other processing subsystem is just operating as a ready spare, with its outputs de-powered. Failure of one processing subsystem does not preclude dispatch, as long as the remaining processing subsystem can provide full functionality. Typically the aircraft is allowed to operate for a limited period of time with just a single operative processing subsystem.

In a preferred embodiment of the present invention, EEC 18 utilizes an active/active configuration. EEC first processing subsystem 20a and EEC second processing subsystem 20b are both always actively monitoring engine function and independently have the capability of shutting down the engine. However, with respect to all the other engine control functions, one of processing subsystems 20a or 20b is in active control and the other processing subsystem is in standby mode. TCMA circuit 16 provides the ability for either EEC first processing subsystem 20a or EEC second processing subsystem 20b to unilaterally shut off fuel flow to the engine by removing voltage from HPSOV open coil 118 and applying voltage to HPSOV closed coil 100. Therefore, the active/active configuration allows for failure of the relay in the processing subsystem that is actively controlling, i.e. first channel relay 22 or second channel relay 28, because the standby processing subsystem still performs the TCMA function. Having relays 22 and 28 in processing subsystems 20a and 20b respectively, also supports the existing allowance for dispatching the airplane with just a single operative processing subsystem. Therefore, even with one processing subsystem inoperative, EEC 18 provides full TCMA functionality such that dispatching the aircraft is not precluded. Furthermore, implementation of TCMA circuit 16 only requires minimal changes in airplane wiring from the baseline system.

Engine control system 10 implements engine malfunction control software package 130 which is stored in the dedicated memory device of processing subsystem 20a and the dedicated memory device of processing subsystem 20b. Execution of the software package 130 stored in each processing subsystem monitors the functioning of the same engine, thereby providing redundant engine monitoring systems. The processor in processing subsystem 20a executes the malfunction software package 130 stored in the memory device of processing subsystem 20a, and the processor in processing subsystem 20b executes the malfunction software package 130 stored in the memory device of processing subsystem 20b. Each software package 130 is executed independent of the other, thereby providing redundant protection against such a malfunction. Thus, thrust control malfunction circuit 16 is a redundant circuit that utilizes both processing subsystems 20a and 20b to unilaterally execute software package 130 included in each respective processing subsystem. Therefore, the description of the function, use, and execution of engine control malfunction software package 130 herein refers to the simultaneous function, use and execution of the software package 130 included in processing subsystem 20a and the software package 130 included in processing subsystem 20b.

Additionally, although the description of the present invention is described below in terms of engine control malfunction software package 130 having a direct effect on, and direct control of, system 10, is should be understood that it is the instructions generated by the execution of software package 130 by first processing subsystem 20a and second processing subsystem 20b, and the subsequent implementation of such instructions by processing subsystems 20a and 20b that have direct effect on, and direct control of, system 10.

Software package 130 determines whether there is an engine malfunction of the type occurring when a pilot has commanded the engine to idle speed, via throttle 36 input, but the engine does not decelerate normally. If such an engine malfunction occurs when the aircraft is on the ground, software package 130 automatically cuts fuel to the engine causing the engine to shut down. Software package 130 utilizes processing subsystems 20a and 20b to determine when throttle 36 is set to idle and whether an engine thrust control malfunction has occurred. Processing subsystems 20a and 20b of EEC 18 each receive signals from a throttle resolver (not shown) that indicates the setting, or position, of throttle 36. The throttle position defines the thrust level commanded by the pilot or an autothrottle system, and EEC 18 determines a power set command, and then modulates the fuel to achieve that command, whether the command is rotor speed or engine pressure ratio. Additionally, processing subsystem 20a and processing subsystem 20b each receive a signal indicating engine power level indicated by actual rotor speed or actual engine pressure ratio. These throttle position signals, engine power level commands, and engine power level signals are monitored by software package 130. Furthermore, software package 130 develops, or derives, a contour threshold from the power lever 36 command and the expected engine response, which is used to determine when an engine malfunction occurs. The contour threshold is described further below in reference to FIG. 2.

Software package 130 monitors engine power level and compares the power level to the threshold contour. If, when the aircraft is on the ground, throttle 36 is set to idle speed and the engine power level exceeds the threshold contour, software package 130 of one or both processing subsystems 20a and 20b will shut down the engine by cutting fuel to the engine. Software package 130 cuts fuel to the engine by causing EEC 18 to remove voltage across HPSOV open coil 118 and introducing voltage across HPSOV closed coil 100. In a preferred embodiment, engine power level is based on engine fan speed. Alternatively, engine power level can be determined in any feasible manner, for example, the engine power level can be based on an engine pressure ratio (EPR), or EPR analytically converted to fan speed, or compressor speed.

Although software package 130 is executed while the aircraft is in flight and on the ground, software package will only cut fuel to the engine if the aircraft is on the ground. Software package 130 monitors the flight status of the aircraft using system information received by EEC 18.

Figure 2:
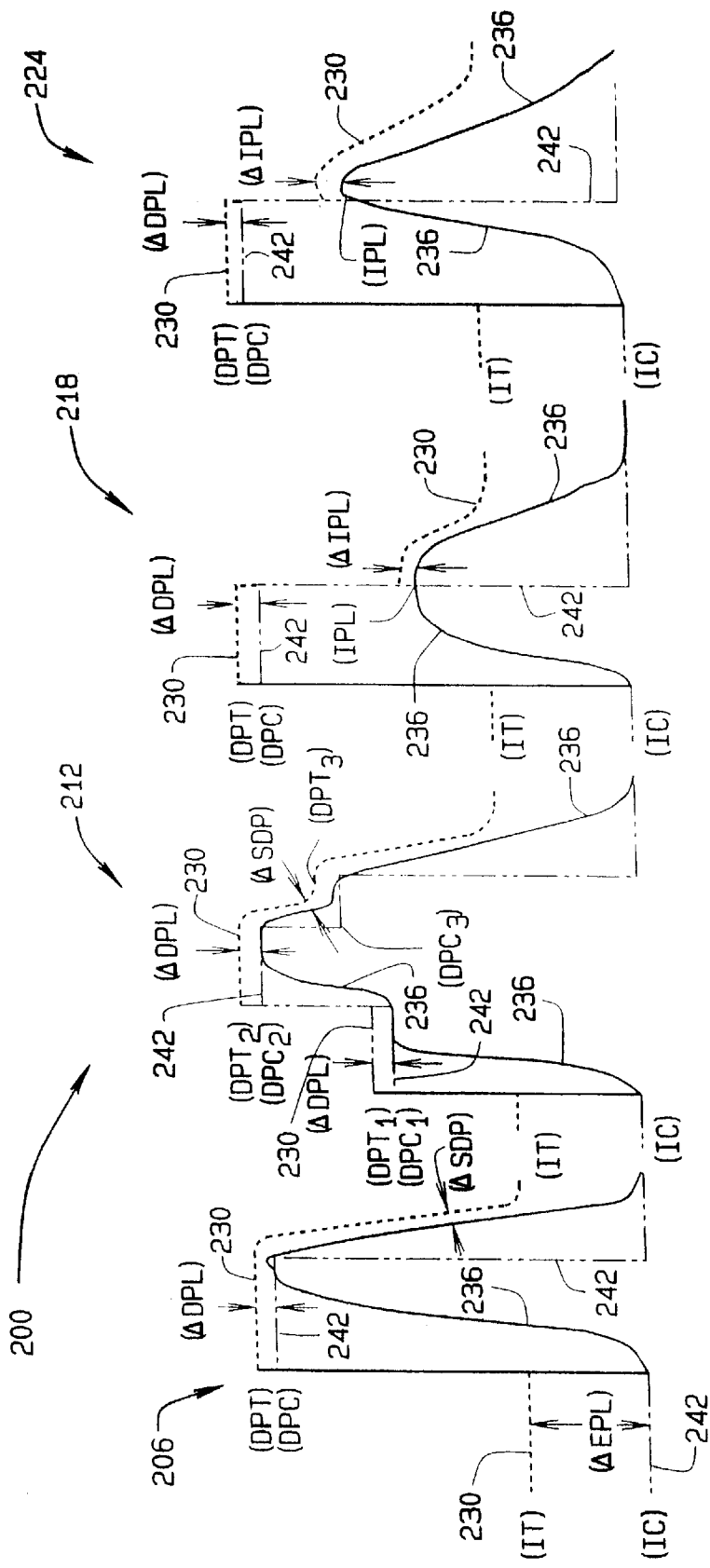
FIG. 2 is a graphical representation showing the execution of a software package included in the engine control system shown in FIG. 1, during four scenarios of normal engine operation.

FIG. 2 is a graphical representation 200 showing the execution of software package 130 (shown in FIG. 1) during four scenarios of normal engine operation. Graphical representation 200 includes a first normal operation scenario 206, a second normal operation scenario 212, a third normal operation scenario 218, and a fourth normal operation scenario 224. Each of scenarios 206, 212, 218, and 224 shows a threshold contour 230 derived by software package 130, an actual engine power curve 236 and a commanded power curve 242. Commanded power 242 is based on the positioning, or maneuvering, of throttle 36 (shown in FIG. 1).

First normal operation scenario 206 depicts how software package 130 functions when throttle 36 is maneuvered such that engine power is increased from an idle power level to a desired level and decreased back to the idle power level. Commanded power 242 starts at an idle command (IC) level and increases to a desired power command (DPC) level as throttle 36 is advanced. When the commanded power 242 is at idle command level IC, software package 130 sets threshold contour 230 at an idle threshold (IT) level, which is a predetermined engine power level ($\Delta$EPL) above the idle command level IC. Threshold contour 230 will never go below the idle threshold level IT. As commanded power 242 is increased to the desired power command level DPC, threshold contour 230 tracks commanded power 242, increasing at the same rate until commanded power 242 plateaus at the desired power command level DPC. When commanded power 242 plateaus at the desired power command level DPC, software package 130 increases threshold contour 230 to a desired power threshold level (DPT), which is a predetermined power level (ADPL) above the desired power commanded level DPC.

Additionally, first normal operation scenario 206 shows actual engine power 236 increasing, or spooling up, until actual engine power 236 reaches the desired power commanded level DPC. When the engine spools up to and reaches the desired power commanded level DPC, the engine may overshoot the desired power commanded level DPC slightly. Contour 230 accounts for the overshoot by setting $\Delta$DPL large enough to allow for the engine power overshoot without actual engine power 236 reaching the desired power threshold DPT. Furthermore, first normal operation scenario 206 shows how when throttle 36 is retarded, or pulled back, commanded power 242 is reduced from the desired power command level DPC to the idle command level IC. However, once the engine has spooled up to the desired power command level DPC, the engine cannot instantaneously go from the desired power command level DPC to the idle command level IC, but must spool down at a certain rate of deceleration. Therefore, actual engine power 236 spools down to the idle command level IC at a certain rate.

When commanded power 242 is lowered to the idle command level IC, software package 130 no longer derives threshold contour 230 based on commanded power 242. Instead, software package 130 derives threshold contour 230 based on a function of a normal engine power deceleration rate. The normal engine power deceleration rate is mapped using engine characteristics, test data and predictive mathematical analysis. The function reduces the power level of threshold contour 236 from desired power threshold level DPT to idle threshold level IT at a rate equal to the normal engine deceleration rate plus a predetermined amount of margin ΔSDP.

Second normal operation scenario 212 depicts how software package 130 functions when throttle 36 is maneuvered such that engine power is increased from an idle power level to a desired level, then increased again to another desired level, and then spooled down to yet another desired level and finally spooled back down to the idle power level. As in first normal operation scenario 206, commanded power 242 starts at the idle command level IC, and threshold contour 230 starts at the idle threshold level IT. Then, commanded power 242 is increased to a first desired power command level ($DPC_1$) and threshold contour 230 tracks commanded power 242 until commanded power 242 plateaus. Once commanded power 242 plateaus, software package 130 sets threshold contour 230 at a first desired power threshold level ($DPT_1$) that is the predetermined power level ΔDPL above desired power command level $DPC_1$.

Commanded power 242 is then increased to a second desired power command level ($DPC_2$). Once again threshold contour 230 tracks commanded power 242 and gets set at a second desired power threshold level ($DPT_2$) that is the predetermined power level ΔDPL above $DPC_2$. Throttle 36 is then retarded and commanded power 242 steps down to a third desired power command level ($DPC_3$). As in first scenario 206, when commanded power 242 is stepped down, software package 130 determines threshold command 230 based on a function of normal engine deceleration. Thus, as the actual engine power 236 spools down, software package 130 reduces threshold contour 230 at a rate equal to the normal engine deceleration rate plus the predetermined amount of margin ΔSDP. Once actual power 236 has spooled down to $DPC_3$, software package 130 again derives threshold contour 230 as commanded power 242 plus ΔDPL. Throttle 36 is then retarded again causing commanded power 242 to decline to idle power level IC and actual power 236 to spool down to idle power level IC at a certain rate. Once again, as actual power 236 spools down, software 130 derives threshold contour 230 as a function of the normal engine deceleration rate until threshold contour 230 reaches the idle threshold level IT, at which point threshold contour 230 levels off at the idle threshold level IT.

Third normal operation scenario 218 depicts how software package 130 functions when throttle 36 is positioned such that engine power is increased from an idle power level to a desired level, but the engine does not spool up to the desired level. Again, as in first normal operation scenario 206, commanded power 242 starts at the idle command level IC, and threshold contour 230 starts at the idle threshold level IT. Throttle 36 is advanced and commanded power 242 is increased to the desired power command level DPC and threshold contour 230 tracks commanded power 242 until commanded power 242 plateaus. At this point software package 130 sets threshold contour at the desired power threshold level DPT that is the predetermined power level ΔDPL above the desired power command level DPC. However, in third scenario 218, actual power 236 does not spool up to the desired power command level DPC, but only reaches an insufficient power level (IPL).

Throttle 36 is then pulled back to idle because the engine is not spooling up to the desired power commanded level DPC. As throttle 36 is retarded and commanded power 242 is reduced to the idle command level IC, software 130 determines whether actual power 236 has reached the desired power command level DPC. If actual power 236 is at the desired power command level DPC, then software package 130 derives the threshold contour based on a function of the normal engine deceleration rate, as described above in reference to first normal operation scenario 206. If actual power 236 is not at the desired power command level DPC, software package 130 identifies the insufficient power level IPL, and sets threshold contour equal to the insufficient power level IPL plus a predetermined amount of power ΔIPL. From the insufficient power level IPL plus ΔIPL point to the idle command level IC, software package 130 derives threshold contour 230 based on the function of the normal engine deceleration rate.

Fourth normal operation scenario 224 depicts how software package 130 functions when throttle 36 is positioned such that engine power is increased from idle power to a desired power, but then retarded to idle as the engine is spooling up. Again, as in first normal operation scenario 206, commanded power 242 starts at the idle command level IC and threshold contour 230 starts at the idle threshold level IT. Throttle 36 is advanced and commanded power 242 is increased to the desired power command level DPC. Threshold contour 230 tracks commanded power 242 until commanded power 242 plateaus. At this point software package 130 sets threshold contour at the desired power threshold level DPT, which is the predetermined power level ΔDPL above the desired power command level DPC. However, in normal operation scenario 224, commanded power 242 is pulled back to the idle command power level IC while actual power 236 is still spooling up and has only reached the insufficient power level IPC.

If the engine is still accelerating when throttle 36 is retarded to idle, software 130 derives threshold contour 130 taking into account the fact that the engine cannot instantaneously begin to decelerate, but must first turn around. When throttle 36 is retarded and commanded power 242 is reduced to idle, software 130 determines whether actual power 236 has reached the desired power command level DPC. If actual power 236 has reached the desired power command level DPC, software package 130 derives threshold contour 230 based on a function the normal engine deceleration rate, as described above in reference to first scenario 206. If actual power 236 has not reached the desired power command level DPC, software package 130 determines the insufficient power level IPL. Software package 130 then sets threshold contour 230 equal to the insufficient power level IPL plus the predetermined amount of power ΔIPL determined form the acceleration rate at the time the throttle was retarded to idle. From the insufficient power level IPL plus ΔIPL point to the idle command level IC, software package 130 derives threshold contour 230 based on the function of the normal engine deceleration rate.

Figure 3:
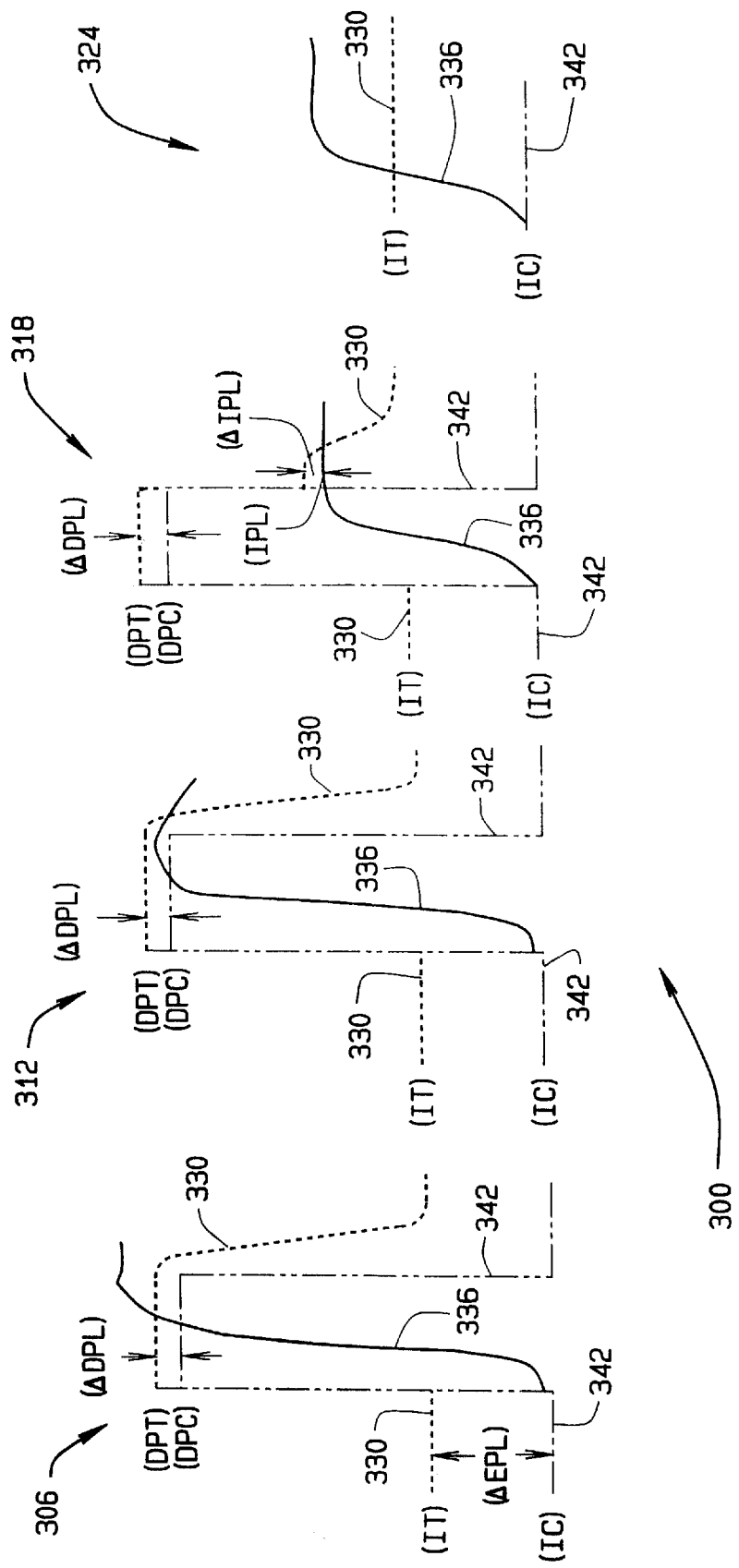
FIG. 3 is a graphical representation showing the execution of a software package included in the engine control system shown in FIG. 1, during four scenarios of abnormal engine operation.

FIG. 3 is a graphical representation 300 showing the execution of software package 130 (shown in FIG. 1) during four scenarios of abnormal engine operation. Components shown in FIG. 3 that are identical to components shown in FIG. 2 are identified in FIG. 3 using numerals incremented by 100 over the numerals used in FIG. 2. Graphical representation 300 includes a first abnormal operation scenario 306, a second abnormal operation scenario 312, a third abnormal operation scenario 318, and a fourth abnormal operation scenario 324. Each of scenarios 306, 312, 318, and 324 shows a threshold contour 330 developed, or derived, by software package 130, an actual engine power curve 336 and a commanded power curve 342. Commanded power 342 is based on the positioning, or maneuvering, of throttle 36 (shown in FIG. 1).

First abnormal operation scenario 306 depicts how software package 130 functions when throttle 36 is advanced, then pulled back to idle because the engine continues to accelerate after reaching a desired power level. As described above in reference to first normal operation scenario 206 (shown in FIG. 2), when throttle 36 is advanced, commanded power 342 increases from the idle command level IC to the desired power command level DPC and threshold contour 330 increases from the idle threshold level IT to the desired power threshold level DPT. Scenario 306 shows actual engine power 336 spooling up and reaching the desired power command level DPC, but then continuing to spool up and exceeding the desired power threshold level DPT. Throttle 36 is then retarded, or pulled back, causing commanded power 342 to fall to the idle command level IC and threshold contour 330 to decline to the idle threshold level IT at a rate based on the function of the normal engine power deceleration rate. As described above in reference to first normal operation scenario 206, the normal engine power deceleration rate is mapped using engine characteristics, test data and predictive mathematical analysis.

However, in scenario 306, when throttle 36 is pulled back and commanded power 342 declines to the idle command level IC, the engine fails to spool down causing actual engine power 336 to continue to exceed threshold contour 330. When actual engine power 336 continues to exceed threshold contour 330 after throttle 36 has been retarded to idle position, software package 130 identifies the abnormal engine performance as a thrust control malfunction and cuts fuel to the engine.

Based on which processing subsystem, or channel, of EEC 18 identifies the thrust control malfunction, the related software package 130 cuts fuel by closing the related relay switch 22 or 28 of thrust control malfunction accommodation circuit 16. If software package 130 in first processing subsystem 20a, i.e. channel A, identifies the thrust control malfunction, relay switch 22 is moved to the cutoff position. Likewise, if software package 130 in second processing subsystem 20b, i.e. channel B, identifies the thrust control malfunction, relay switch 28 is moved to the cutoff position. Upon moving either relay switch 22 or relay switch 28 to the cutoff position, voltage is removed from HPSOV open coil 118 and applied across HPSOV closed coil 100, thereby cutting fuel to the engine and causing the engine to shut down. Software package 130 only identifies a thrust control malfunction and cuts fuel to the engine when software package 130 verifies that the aircraft is on the ground, throttle 36 has been pulled back to the idle position, and actual engine power 336 exceeds threshold contour 330.

Second abnormal operation scenario 312 depicts how software package 130 functions when the engine has achieved a desired power level but does not spool down normally when throttle 36 is pulled back to the idle position. Scenario 312 shows that throttle 36 has been advanced causing commanded power 342 to increase from the idle command level IC to the desired power command level DPC and threshold contour 330 to increase from the idle threshold level IT to the desired power threshold level DPT. Actual engine power 336 spools up to a point past the desired power command level DPC, but does not exceed the desired power threshold level DPT. Then throttle 36 is pulled back to the idle position causing commanded power 342 to step down to the idle command level IC. When throttle 36 is pulled back to the idle position, threshold contour 330 decreases to the idle threshold level IT at a rate based on a function of the normal engine deceleration rate, as described above in reference to first normal operation scenario 206 (shown in FIG. 2). However, in abnormal operation scenario 312, actual engine power 336 does not spool down at the normal engine deceleration rate and therefore exceeds threshold contour 330.

When actual engine power 336 spools down abnormally and exceeds threshold contour 330 after throttle 36 has been retarded to idle position, software package 130 identifies the abnormal engine performance as a thrust control malfunction and cuts fuel to the engine. As described above in reference to first abnormal operation scenario 306, based on which processing subsystem, or channel, of EEC 18 identifies the thrust control malfunction, the related software package 130 cuts fuel by closing the related relay switch 22 or 28 of thrust control malfunction accommodation circuit 16.

Third abnormal operation scenario 318 depicts how software package 130 functions when throttle 36 is advanced, but the engine does not spool up to the desired level, and throttle 36 is pulled back to the idle position. Scenario 318 shows that throttle 36 has been advanced causing commanded power 342 to increase from the idle command level IC to the desired power command level DPC and threshold contour 330 to increase from the idle threshold level IT to the desired power threshold level DPT. In scenario 318, actual engine power 336 spools up but only to an insufficient power level (IPL).

Throttle 36 is then pulled back to idle because the engine is not spooling up to the desired power commanded level DPC. As described above in reference to third normal operation scenario 218 (shown in FIG. 2), when throttle 36 is pulled back and commanded power 342 is reduced to idle, software 130 determines whether actual engine power 336 has reached the desired power command level DPC. If actual power 336 has reached the desired power command level DPC, software package 130 derives threshold contour 330 based on a function of the normal engine deceleration rate. If actual power 236 has not reached the DPC, software package 130 identifies the insufficient power level IPL, and sets threshold contour 330 equal to the insufficient power level IPL plus the predetermined amount of power ΔIPL. From the insufficient power level IPL plus ΔIPL point to the idle command level IC, software package 130 derives threshold contour 330 based on the function of the normal engine deceleration rate.

In abnormal operation scenario 318, the engines fails to spool down when throttle 36 is pulled back to idle. Therefore, actual engine power 336 remains at the insufficient power level IPL and exceeds threshold contour 330. When actual engine power 336 exceeds threshold contour 330 and throttle 36 is in the idle position, software package 130 identifies the abnormal engine performance as a thrust control malfunction and cuts fuel to the engine as described above in reference to first abnormal operation scenario 306.

Fourth abnormal operation scenario 324 depicts how software package 130 functions when throttle 36 is in an idle position and the engine runs away. Scenario 324 shows commanded power 342 remaining at the idle command level IC, threshold contour 330 remaining at the idle threshold level IT, and actual engine power 336 spooling up and exceeding threshold contour 330. When actual engine power 336 exceeds threshold contour 330 and throttle 36 in the idle position, software package 130 identifies the abnormal engine performance as a thrust control malfunction and cuts fuel to the engine as described above in reference to first abnormal operation scenario 306.

While the invention has been described in terms of various specific embodiments, those skilled in the art will recognize that the invention can be practiced with modification within the spirit and scope of the claims.

What is claimed is:

1. A system for detecting and responding to a thrust control malfunction in an engine, said system comprising:
   an electronic engine control (EEC) unit including independent first and second processing subsystems, said processing subsystems being arranged to independently monitor a plurality of operational characteristics of said engine;
   a thrust control malfunction accommodation (TCMA) circuit associated with said first and second processing subsystems for counteracting a thrust control malfunction condition detected via either of said first and second processing subsystems; and
   wherein said first and second processing subsystems provide redundant monitoring of said engine operational characteristics and control over said TCMA circuit.

2. The system of claim 1, wherein said first processing subsystem is configured to independently determine if an engine malfunction occurs based on the monitored operational characteristics and independently shut down the engine when an engine malfunction occurs.

3. The system of claim 1, wherein said second processing subsystem is configured to:
   independently determine if an engine malfunction occurs based on the monitored operational characteristics; and
   independently shut down the engine when an engine malfunction occurs and the engine is not shutdown by said first processing subsystem.

4. The system of claim 1, wherein said TCMA circuit comprises:
   a first EEC relay switch controlled by said first processing subsystem;
   a second EEC relay switch controlled by said second processing subsystem;
   said first EEC relay switch operating to cut fuel to the engine independent of said second EEC relay switch, and said second relay switch operating to cut fuel to the engine independent of said first EEC relay switch when said first EEC relay switch fails to cut fuel to the engine.

5. The system of claim 4, wherein said first processing subsystem is further configured to:
   monitor an actual engine power level, a commanded engine power level, and an aircraft flight status;
   derive a threshold contour based on said commanded engine power level and a normal engine deceleration rate; and
   cause said first EEC relay switch to cut fuel to the engine when said actual power level exceeds said threshold contour, said commanded engine level is at an idle command level, and said aircraft is on a ground surface.

6. The system of claim 4, wherein said second processing subsystem is further configured to:
   monitor an actual engine power level, a commanded engine power level, and an aircraft flight status;
   derive a threshold contour based on said commanded engine power level and a normal engine deceleration rate; and
   cause said second EEC relay switch to cut fuel to the engine when said actual power level exceeds said threshold contour, said commanded engine level is at an idle command level, and said aircraft is on a ground surface.

7. The system of claim 1, wherein said EEC is configured to have an active-active functionally, whereby both said first processing subsystem and said second processing subsystem are configured to unilaterally monitor engine operation and to cut fuel to the engine utilizing said TCMA circuit.

8. The system of claim 7, wherein said EEC is configured to have an active-active functionally such that if one of said first processing subsystem and said second processing subsystem becomes inoperable the remaining processing subsystem continues to monitor engine operation and cut fuel to the engine when a thrust control malfunction occurs.

9. A method for detecting and responding to a thrust control malfunction in an engine utilizing a thrust control malfunction accommodation (TCMA) system including an electronic engine control (EEC) and a TCMA circuit, said method comprises:
   deriving a threshold contour;
   determining when a thrust control malfunction occurs based on the threshold contour; and
   shutting down the engine when a thrust control malfunction occurs utilizing the TCMA circuit.

10. The method of claim 9, wherein the EEC includes a first processing subsystem and a second processing subsystem, and wherein deriving a threshold contour comprises operating the first and second processing subsystems in a redundant manner such that selected operational characteristics of the engine are monitored by both the first processing subsystem and the second processing subsystem.

11. The method of claim 10, wherein deriving a threshold contour further comprises:
   providing a pre-defined map of a normal engine deceleration rate;
   monitoring a commanded engine power level utilizing the first processing subsystem, independent of the second processing subsystem; and
   deriving the threshold contour based on the commanded engine power level and the normal engine deceleration rate.

12. The method of claim 11, wherein determining when a thrust control malfunction occurs comprises:
   monitoring an actual engine power level and an aircraft status utilizing the first processing subsystem, independent of the second processing subsystem; and
   utilizing the first processing subsystem to identify a thrust control malfunction when the actual engine power level exceeds the threshold contour, the commanded engine power level is at an idle command level, and the aircraft is on a ground surface.

13. The method of claim 10, wherein deriving a threshold contour further comprises:
   providing a pre-defined map of a normal engine deceleration rate;
   monitoring a commanded engine power level utilizing the second processing subsystem, independent of the first processing subsystem; and
   deriving the threshold contour based on the commanded engine power level and the normal engine deceleration rate.

14. The method of claim 13, wherein determining when a thrust control malfunction occurs comprises:
   monitoring an actual engine power level and an aircraft status utilizing the second processing subsystem, independent of the first processing subsystem; and
   utilizing the second processing subsystem to identify a thrust control malfunction when the actual engine power level exceeds the threshold contour, the commanded engine power level is at an idle command level, and the aircraft is on a ground surface.

15. The method of claim 10, wherein the TCMA circuit includes a first EEC relay switch controlled by the first processing subsystem, and wherein shutting down the engine when a thrust control malfunction occurs comprises causing the first EEC relay switch to cut fuel to the engine when a thrust control malfunction occurs.

16. The method of claim 15, wherein the TCMA circuit includes a second EEC relay switch controlled by the second processing subsystem, and wherein shutting down the engine when a thrust control malfunction occurs comprises causing the second EEC relay switch to cut fuel to the engine when a thrust control malfunction occurs and the first EEC relay switch has not cut fuel to the engine.

17. The method of claim 16, wherein shutting down the engine comprises:

operating the EEC in an active-active functional manner, whereby both the first processing subsystem and the second processing subsystem unilaterally monitor engine operation and can unilaterally cut fuel to the engine utilizing said TCMA circuit; and operating the EEC in an active-active functional manner such that if one of the first processing subsystem and the second processing subsystem becomes inoperable the remaining processing subsystem continues to monitor the engine operation and control the related EEC relay switch.

18. An electronic engine control (EEC) unit configured to detect and respond to an aircraft engine thrust control malfunction using an active-active functionality, said EEC comprising:

a first processing subsystem configured to unilaterally monitor engine operation and shut down the engine when a thrust control malfunction occurs; and a second processing subsystem configured to unilaterally monitor engine operation and shut down the engine when a thrust control malfunction occurs.

19. The electronic engine control of claim 18, wherein said EEC includes a first EEC relay switch controlled by said first processing subsystem, said first processing subsystem further configured to:

unilaterally monitor selected operational characteristics of the engine; and unilaterally cause said first EEC relay switch to cut fuel to the engine when said first processing subsystem identifies a thrust control malfunction based on the monitored engine operational characteristics.

20. The electronic engine control of claim 18, wherein said EEC further includes a second EEC relay switch controlled by said second processing subsystem, said second processing subsystem further configured to:

unilaterally monitor the various operational characteristics of the engine; and unilaterally cause said second EEC relay switch to cut fuel to the engine when said second processing subsystem identifies a thrust control malfunction and said first processing subsystem has failed to shut down the engine.

* * * * *